United States Patent
Abbott et al.

(10) Patent No.: US 7,904,300 B2
(45) Date of Patent: Mar. 8, 2011

(54) SUPPORTING MULTIPLE SPEECH ENABLED USER INTERFACE CONSOLES WITHIN A MOTOR VEHICLE

(75) Inventors: Lisa Abbott, Delray Beach, FL (US); Daniel E. Badt, Atlantis, FL (US); Werayuth T. Charoenruengkit, Delray Beach, FL (US); John W. Eckhart, Boca Raton, FL (US); Michael Florio, Lake Worth, FL (US); Gary R. Hanson, Boynton Beach, FL (US); Harvey M. Ruback, Loxahatchee, FL (US); William Russell Whitehead, Delray Beach, FL (US); Steven G. Woodward, Thousand Oaks, CA (US)

(73) Assignee: Nuance Communications, Inc., Burlington, MA (US)

( * ) Notice: Subject to any disclaimer, the term of this patent is extended or adjusted under 35 U.S.C. 154(b) by 402 days.

(21) Appl. No.: 11/200,811

(22) Filed: Aug. 10, 2005

(65) Prior Publication Data
US 2007/0038461 A1    Feb. 15, 2007

(51) Int. Cl.
*G10L 21/00* (2006.01)
(52) U.S. Cl. ......................... 704/275; 704/270
(58) Field of Classification Search ............ 704/275
See application file for complete search history.

(56) References Cited

U.S. PATENT DOCUMENTS

| 6,230,138 | B1* | 5/2001 | Everhart ............ 704/275 |
| 6,240,347 | B1* | 5/2001 | Everhart et al. ............ 701/36 |
| 6,408,272 | B1* | 6/2002 | White et al. ............ 704/270.1 |
| 6,434,450 | B1* | 8/2002 | Griffin et al. ............ 701/1 |
| 6,513,010 | B1* | 1/2003 | Lewin et al. ............ 704/270.1 |
| 6,529,608 | B2* | 3/2003 | Gersabeck et al. ............ 381/110 |
| 6,532,447 | B1* | 3/2003 | Christensson ............ 704/275 |
| 6,539,358 | B1* | 3/2003 | Coon et al. ............ 704/275 |
| 6,553,296 | B2* | 4/2003 | Breed et al. ............ 701/45 |
| 6,567,787 | B1* | 5/2003 | Walker et al. ............ 705/16 |
| 6,587,824 | B1* | 7/2003 | Everhart et al. ............ 704/275 |
| 6,601,029 | B1* | 7/2003 | Pickering ............ 704/257 |
| 6,622,083 | B1* | 9/2003 | Knockeart et al. ............ 701/202 |

(Continued)

FOREIGN PATENT DOCUMENTS

CA    2329304    6/2000

(Continued)

OTHER PUBLICATIONS

A. Moreno et al., "SpeechDat-Car: A large speech database for automotive environments," in Proc. II LREC, Jun. 2000.*

(Continued)

*Primary Examiner* — Richemond Dorvil
*Assistant Examiner* — Greg A Borsetti
(74) *Attorney, Agent, or Firm* — Wolf, Greenfield & Sacks, P.C.

(57) ABSTRACT

An in-vehicle system that shares speech processing resources among multiple applications located within a vehicle. The system can include one or more software applications, each associated with different functionally independent in-vehicle consoles. Each application can have a console specific user interface. The system can also include a single in-vehicle speech processing system implemented separately from the in-vehicle consoles. The speech processing system can execute speech processing tasks responsive to requests received from the applications. That is, the in-vehicle speech processing system can provide speech processing capabilities for the applications. The provided speech processing capabilities can include text-to-speech capabilities and speech recognition capabilities.

30 Claims, 4 Drawing Sheets

U.S. PATENT DOCUMENTS

| | | | |
|---|---|---|---|
| 6,650,997 B2 * | 11/2003 | Funk | 701/207 |
| 6,654,720 B1 * | 11/2003 | Graham et al. | 704/270 |
| 6,675,147 B1 * | 1/2004 | Woestemeyer et al. | 704/275 |
| 6,748,361 B1 * | 6/2004 | Comerford et al. | 704/275 |
| 6,754,373 B1 | 6/2004 | de Cuetos et al. | |
| 6,812,942 B2 | 11/2004 | Ribak | |
| 6,839,670 B1 * | 1/2005 | Stammler et al. | 704/251 |
| 6,853,972 B2 | 2/2005 | Friedrich et al. | |
| 6,968,311 B2 * | 11/2005 | Knockeart et al. | 704/270 |
| 7,016,836 B1 * | 3/2006 | Yoda | 704/233 |
| 7,085,710 B1 * | 8/2006 | Beckert et al. | 704/201 |
| 7,158,871 B1 * | 1/2007 | Ilan et al. | 701/49 |
| 7,203,651 B2 * | 4/2007 | Baruch et al. | 704/270.1 |
| 7,353,176 B1 * | 4/2008 | Baray et al. | 704/275 |
| 7,428,454 B2 * | 9/2008 | Shikano et al. | 701/36 |
| 7,457,755 B2 * | 11/2008 | Konig | 704/275 |
| 7,571,102 B2 * | 8/2009 | Vandivier | 704/275 |
| 7,716,056 B2 * | 5/2010 | Weng et al. | 704/275 |
| 2002/0101505 A1 | 8/2002 | Gutta et al. | |
| 2002/0135618 A1 | 9/2002 | Maes et al. | |
| 2003/0040914 A1 | 2/2003 | Friedrich et al. | |
| 2003/0058545 A1 * | 3/2003 | Ichikawa et al. | 359/630 |
| 2003/0101054 A1 * | 5/2003 | Davis et al. | 704/235 |
| 2003/0156130 A1 * | 8/2003 | James et al. | 345/728 |
| 2003/0158736 A1 * | 8/2003 | James et al. | 704/270.1 |
| 2003/0212562 A1 * | 11/2003 | Patel et al. | 704/275 |
| 2004/0022437 A1 * | 2/2004 | Beardsley | 382/199 |
| 2004/0145496 A1 | 7/2004 | Ellis | |
| 2004/0183749 A1 | 9/2004 | Vertegaal | |
| 2004/0193420 A1 | 9/2004 | Kennewick et al. | |
| 2004/0267534 A1 * | 12/2004 | Beiermeister et al. | 704/275 |
| 2005/0065779 A1 | 3/2005 | Odinak | |
| 2005/0071080 A1 | 3/2005 | Sano | |
| 2005/0071159 A1 | 3/2005 | Boman et al. | |
| 2005/0137877 A1 * | 6/2005 | Oesterling et al. | 704/275 |
| 2005/0209852 A1 * | 9/2005 | Beckert et al. | 704/246 |

FOREIGN PATENT DOCUMENTS

| | | |
|---|---|---|
| JP | 3182849 | 8/1991 |
| WO | WO 2005/024781 | 3/2005 |

OTHER PUBLICATIONS

R. Kaucic, B. Dalton, and A. Blake. "Real-time lip tracking for audio-visual speech recognition applications". ECCV-96, Cambridge, UK, 1996.*

T Kuhn, A Jameel, M Stumpfle, A Haddadi—Vehicular Technology Conference, 1999 IEEE 49th, 1999.*

Ephraim Schwartz. "IBM demos car of the future" CNN.com. Aug. 16, 2001.*

IBM(R) ViaVoice(tm) SDK. SMAPI Developer's Guide Mar. 2001.*

Franklin, D., "Cooperating With People: The Intelligent Classroom", Dept. of COmputer Science, University of Chicago, (AAAI98).

* cited by examiner

SUPPORTING MULTIPLE SPEECH ENABLED USER INTERFACE CONSOLES WITHIN A MOTOR VEHICLE

BACKGROUND

1. Field of the Invention

The present invention relates to the field of speech processing and, more particularly, to supporting multiple speech-enabled user interface consoles within a vehicle.

2. Description of the Related Art

The cabin of a motor vehicle is becoming increasingly sophisticated from a technological perspective, meaning that various types of computing components are commonly embedded within motor vehicles. For example, in-vehicle computing components can exist which perform vehicle navigation, control an audio system, control a video system, control vehicle sensors and actuators, provide telephony services, connect passengers to the Internet, and permit passengers to play games while in the vehicle. Currently, in the motor vehicle environment, each unique functional component of the cabin is controlled by an independent computing system or console, which may or may not communicate with other in-vehicle computing systems.

As the in-vehicle user interfaces become more advanced and as the complexity of in-vehicle computer systems continue to increase, the cost of each of these isolated systems can outweigh their benefits. Additionally, customers will likely demand or at least prefer a more integrated experience which can be obtained by more closely coupling the in-vehicle systems to one another. Therefore, a system is needed that minimizes the hardware and software requirements needed to support multiple unique components in a vehicle while maintaining the high level of functionality and a decreased overall cost per vehicle.

This need is particularly felt in the area of speech technologies. Currently, speech processing tasks, such as speech recognition and speech synthesis, consume a significant amount of computing resources. Providing a plurality of speech processing systems within a single vehicle, each associated with an independent in-vehicle computing system, can result in compromises to speech generation quality, speech recognition accuracy, and/or overall cost.

Architectures of conventionally implemented in-vehicle speech processing systems, such as systems based upon EMBEDDED VIA VOICE SDK by International Business Machines Corporation (IBM) of Armonk, N.Y., are limited to a single application environment. That is, each individual application controls an entire in-vehicle console system, which includes control over a speech-enabled user interface. What is needed is a way to enhance an in-vehicle application environment so that speech resource can be shared among multiple in-vehicle systems. Preferably, the enhancement can be performed in a backwards compatible manner that does not require the complete overhaul of an existing infrastructure.

SUMMARY OF THE INVENTION

The present invention allows multiple applications disposed within in-vehicle systems to co-exist and to share speech processing resources, where the speech processing resources are provided by a single system. The overall system can provide coordinated usage of speech resources while allowing each of the applications that utilize these resources to operate independently. Additionally, the present invention is capable of working with single or multiple in-vehicle audio devices. For example, multiple microphones can be implemented as an array operating as a single in-vehicle audio device or multiple in-vehicle microphones may be treated as separate audio devices linked separately to different in-vehicle consoles and applications for purpose of the invention.

In one embodiment, the limitations of a single application architecture can be overcome through a client/server based model for software components. This model can implement speech resources as server based processes. The server based processes can be requested by applications, which function as clients of the server based processes. Runtime links, such as interprocess communication (IPC) links, can be established between speech resources and applications that utilize the speech resources. Speech processing information can be owned and managed by the server based processes and not by the applications, as is the case with conventionally implemented systems.

In order to provide a coordinated use of the shared speech resources, a focus model can be instituted. That is, one or more speech focuses can be defined to determine which applications are able to utilize the shared resources at any particular time. For example, one speech focus can be established for utilizing speech recognition resources and another speech focus can be established for utilizing text-to-speech generation resources.

In another arrangement, a visual detection mechanism can be utilized to detect which of multiple applications is to be granted speech focus. The visual detection mechanism can utilize one or more cameras that capture images of vehicle occupants. The visual detection mechanism can utilize an "intent to speak" notification, where the notification can indicate that a user is likely to begin speaking.

For example, the images can be processed to detect body movements, head movements toward a console, mouth movements, and other visual queues, which are indicative of an intent to speak. Once an intent to speak notification has been issued, a console proximate to the identified user can be determined. An application associated with the console can be responsively granted speech focus or can be granted an increased priority for receiving speech focus.

For example, schemes can be implemented where multiple applications barter among themselves for speech focus. The bartering is conventionally based upon user interactions with applications executing on a console. Assigning speech focus based upon these interactions, however, can be significantly less accurate in terms of predicting a suitable application for the speech focus than mechanisms based upon a visual intent to speak notification or based upon a combination of the visual intent to speak notification and application interactions.

The present invention can be implemented in accordance with numerous aspects consistent with material presented herein. For example, one aspect of the present invention can include an in-vehicle system that shares speech processing resources among multiple applications located within a vehicle. The system can include one or more software applications, each associated with different functionally independent in-vehicle consoles. Each application can have a console specific user interface. The system can also include a single in-vehicle speech processing system implemented separately from the in-vehicle consoles. The speech processing system can execute speech processing tasks responsive to requests received from the applications. That is, the in-vehicle speech processing system can provide speech processing capabilities for the applications. The provided speech processing capabilities can include text-to-speech capabilities and speech recognition capabilities.

Another aspect of the present invention can include a method for multiple in-vehicle applications to share centrally provided speech processing resources. The method can include the step of identifying one or more in-vehicle applications. Each application can be associated with an in-vehicle console. Each application can be simultaneously and independently utilized by different users. A single speech processing system can provide speech processing capabilities for the applications. The speech processing capabilities can include text-to-speech capabilities and speech recognition capabilities. A first speech processing request can be received from an in-vehicle console associated with a first application and a second speech processing request can be received from an in-vehicle console associated with a second application. The speech processing system can speech process the first and second speech processing requests to generate first and second processing results. The first application can perform a programmatic action based upon the first processing result. The second application can perform a programmatic action based upon the second processing result.

Yet another aspect of the present invention can include another method for multiple in-vehicle applications to share centrally provided speech processing resources. The method can identify one or more in-vehicle applications, each associated with an in-vehicle console, each application configured to be simultaneously and independently utilized by different users. The applications can be developed using a software development kit (SDK) for an embedded software platform. A single speech processing system remote from the applications can provide speech processing capabilities for the applications. Information can be digitally exchanged between the speech processing system and the applications based upon a client/server model. The speech processing system resources can be provided as server resources. The applications can function as clients that utilize the provided speech processing resources. The digital exchange of information can be facilitated by SDK provided libraries and SDK provided Application Program Interfaces (APIs).

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
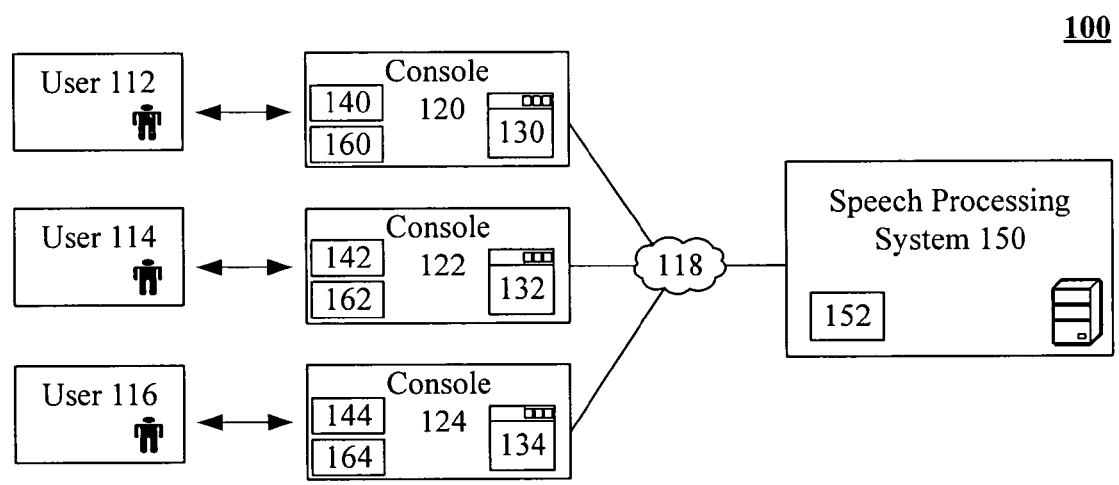
FIG. 1 is a schematic diagram of a system for permitting a plurality of in-vehicle applications to share speech processing resources provided by a centralized system in accordance with an embodiment of the inventive arrangements disclosed herein.

FIG. 1 is a schematic diagram of a system 100 for permitting a plurality of in-vehicle applications to share speech processing resources provided by a centralized system in accordance with an embodiment of the inventive arrangements disclosed herein. System 100 represents an in-vehicle system, where the vehicle can include any of a variety of transportation vehicles, such as automobiles, vans, trucks, sports utility vehicles, buses, aircraft, motor craft, and the like. System 100 can include users 112, 114, and 116, consoles 120, 122, and 124, and speech processing system 150.

Users 112, 114, and 116 can represent passengers of a vehicle in which system 100 is included. For example user 112 can represent a driver, user 114 a front-seat passenger, and user 116 a rear-seat passenger of the vehicle. Each of the users 112, 114, and 116 is able to interact within an in-vehicle console, such as consoles 120, 122, and 124.

Consoles 120, 122, and 124 can be speech-enabled computer systems located within the vehicle. Consoles 120, 122, and 124 can be designed to perform any of a variety of console specific functions, such as vehicle navigation functions, vehicle traffic information functions, vehicle sound system functions, video functions, telephony functions, video game functions, internet browsing functions, vehicle sensor monitoring and displaying functions, actuator control functions, productivity application functions, vehicle commercial application functions, and the like.

The vehicle sound system can include a single stereo system that plays through a cabin of a vehicle as well as console specific systems that provides user specific audio to individual consoles through an audio port. Vehicle sensor monitoring and display functions can provide information about the vehicle itself, such as engine and systems status, fluid and fuel levels, speed, vehicle service information, fluid and fuel consumption statistics, trip statistics, and the like, exterior temperature, direction of travel, and the like. Productivity applications can include e-mail handling, task management, contact management, calendaring and scheduling, etc. Commercial application functions can include logistic delivery applications for delivery vehicles, travel and billing information for passenger vehicles, air traffic functions for aircraft, depth and object detection functions for marine craft, and the like.

Each of the consoles 120, 122, and 124 can have an associated user interface through which different users can simultaneously interact in a functionally independent fashion. For example, user 112 can interact with a navigation console 120 at the same time that user 114 interacts with an Web browsing console 122, which can occur at the same time that user 116 watches a movie on movie console 124. In one embodiment, particular ones of the consoles 120, 122, and 124 can operate in a coordinated fashion. For example, user 114 and 116 can both participate in the same multiplayer video game, with user 114 interfacing through console 122 and user 116 interfacing through console 124.

Additionally, each of the consoles 120, 122, and 124 can include vehicle dockable components that can be selectively removed from the vehicle. removable devices designed to interoperate with and/or to function as consoles 120, 122, and 124 can include, but are not limited to, mobile phones, portable MP3 players, global positioning system (GPS) systems, personal data assistants (PDA's) and other handheld devices, signature capture devices, computing tablets, notebook computers, DVD players, video gaming units, digital cameras, portable storage devices, and the like. Consoles 120, 122, and 124 can comprise after market devices as well as device and/or consoles originally integrated within the vehicle.

Each of the consoles 120, 122, and 124 can be associated with console specific applications, which include application 130, 132, and 134. Each of the applications 130, 132, and 134 can be speech enabled applications. The speech processing capabilities for the applications 130, 132, and 134 can be provided by speech processing system 150. Speech processing capabilities can include text-to-speech capabilities and speech recognition capabilities.

Speech processing system 150 can execute speech processing tasks responsive to requests received from applications 130, 132, and 134. Speech processing system 150 can be communicatively linked to applications 130, 132, and 134 via network 118. The speech processing task can be owned and managed by the speech processing system 150 and not by any of the applications 130, 132, and 134. Speech processing system 150 can support different users 112, 114 and/or 116 concurrently speaking in more than one language.

Network 118 can represent any communication pathway capable of conveying data from one location to another, which can include a wireless or line based pathway.

System 100 can support multiple different audio devices 160, 162, and/or 164. An audio device 160, 162, and/or 164 can include one or more audio transducers (instruments to convert received sound waves into electrical pulses (microphones) as well as instruments that convert electrical pulses to sound (speakers), amplifiers, digital signal processors, sound pressure level detectors to detect ambient noise, and the like. Multiple microphones can be implemented as an array, operating as a single audio device 160, 162, and/or 164. Similarly, multiple speakers can be implemented as an array, operating as a single audio device 160, 162, and/or 164.

In one embodiment, each application 130, 132, and 134 can operate with a particular audio device 160, 162, and/or 164. In another embodiment, each application 130, 132, and 134 can span multiple audio devices 160, 162, and 164. In still another embodiment, a portion of the applications 130, 132, and 134 can be associated with application a single audio devices 160, 162, and 164, while other ones of the applications 130, 132, and 134 can utilize multiple audio devices 160, 162, and 164. Additionally, a portion of the audio devices 160, 162, and 164 can be dedicated to particular applications 130, 132, and 134 while other ones of the audio devices 160, 162, and 164 can be utilized by multiple applications 130, 132, and 134.

In one arrangement, interactions between the speech processing system 150 and applications 130, 132, and 134 can be based upon a client/server model, where the speech processing system 150 functions as a server and where each of the applications 130, 132, and 134 function as clients that utilize speech processing resources of the speech processing system 150.

In one embodiment, applications 130, 132, and 134 can be developed using a software development kit (SDK) for an embedded platform, such as EMBEDDED VIA VOICE SDK. More specifically, the applications 130, 132, and 134 can utilize SDK provided libraries, functions, and Application Program Interfaces (APIs) to enable the applications 130, 132, and 134 to perform speech processing tasks. For example, the SDK libraries can coordinate the usage of speech resources of the speech processing system 150.

Applications developed using an SDK for embedded platforms are unique from other applications in any number of fashions. For example, the applications are for an embedded implementation that can require explicit low-level resource handling. Additionally, the applications can be designed for portability across a verity of target embedded environments, as opposed to being implemented in an environment specific fashion. The applications can also provide a unique handling of audio in that the SDK can supports many complex audio configurations without requiring application specific programming for these audio configurations.

For example, one audio configuration supported by the SDK permit a single application or multiple applications to be supported with a single audio device, such as a microphone, through one audio stream. A single application or multiple application can also be supported with multiple audio devices coming through one audio stream. Further, a single application or multiple applications can be supported with multiple audio devices coming through multiple audio streams, where (1) one application can span multiple audio devices, allowing more than one user to work with the application simultaneously, (2) each of the multiple applications can be associated with separate audio devices, and (3) multiple applications can share a single audio device.

The speech processing system 150 can provide any of a variety of speech services including, but not limited to, Text-to-Speech (TTS) services, speech recognition services, speaker enrollment services, acoustic baseform generation services, speaker identification and verification services, and the like.

Since the speech processing system 150 handles speech processing tasks for multiple applications, a mechanism 152 is necessary for determining which of a plurality of applications requesting limited speech processing resources are to be provided the resources. The mechanism 152 can include a speech focus mechanism. A speech focus mechanism 152 can allow a selected application 130, 132, or 134 to possess a speech focus at any point in time. The application possessing speech focus is permitted to utilize the speech processing resources associated with the speech focus.

Mechanism 152 can utilize one or more speech focuses, each associated with a set of computing resources. In one embodiment, two speech focuses can be established, one for text-to-speech resources and the other for speech recognition resources.

In one contemplated arrangement, speech focus can be determined based upon a series of images of the cabin of the vehicle containing the system 100. The images can be captured from one or more in-vehicle cameras 140, 142, and/or 144. In one embodiment, cameras can be integrated within one or more of consoles 120, 122, and 124. In another embodiment, in-vehicle cameras 140, 142, and 144 can be distinct devices remotely located from consoles 120, 122, and 124. It should be noted that the use of cameras 140, 142, and 144 is an optional feature in the speech focus mechanism and that system 100 can be implemented without this feature.

The images from cameras 140, 142, and/or 144 can be used to determine whether a user has an intent to speak. For example, the cameras 140, 142, and/or 144 can detect visual queues indicative of an intent to speak. When an intent to speak is detected, a console proximate to an individual having the intent to speak can be determined. The application associated with the determined console can be granted speech focus by speech focus mechanism 152 or can at least have an increased chance to be granted the speech focus should mechanism 152 include a bartering system for speech focus.

For example, when images of user 112 indicate that user 112 has an intent to speak, console 120 proximately located to user 112 can be targeted. Since console 120 contains application 130, application 130 can be granted a speech focus, such as a speech focus related to speech recognition. In this manner, visual indicators captured via cameras 140, 142, and/or 144 can operate as a "virtual push to talk" mechanism. That is, visual queues of users 112, 114, and 116 can be captured, processed, and used as indicators that a user is about to issue voice commands to one of the consoles 120, 122, and 124.

Figure 2:
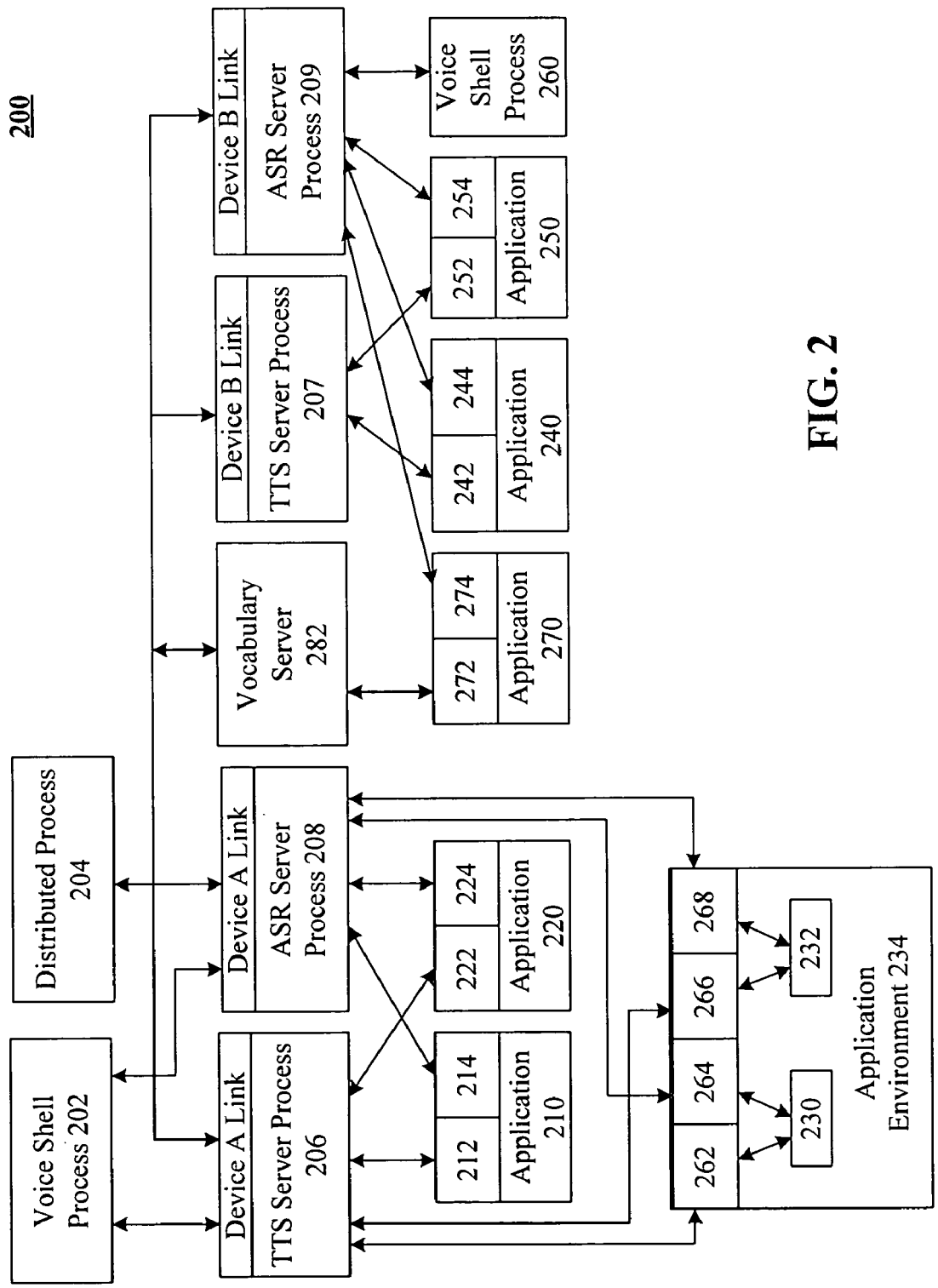
FIG. 2 is a schematic diagram of a system for enabling multiple in-vehicle applications to share resources provided by a single speech processor in accordance with an embodiment of the inventive arrangements disclosed herein.

FIG. 2 is a schematic diagram of a system 200 for enabling multiple in-vehicle applications to share resources provided by a centralized speech processor in accordance with an embodiment of the inventive arrangements disclosed herein. The system 200 represents one contemplated configuration for the system 100. System 200 is not to be limited to the arrangements of system 100, however, and can be utilized in any environment where multiple applications acting as clients share processes served from a speech server.

The architecture shown in FIG. 2 addresses the limitations of a single application architecture by providing a client/server model for SDK components. That is, current embedded SDK architectures are single application architectures where an application controls an entire device or console and also handles interfacing with a user. The illustrated architecture is a multi-application SDK based architecture that permits multiple applications to run on a single CPU.

The illustrated architecture permits recognition and synthesis engines to provide self-contained processes. Runtime links, such as IPC links, can connect these processes with applications. It should be appreciated that in order to provide coordinated use of these resources amongst the client applications, a focus model can be instituted for different speech processes, such as for automatic speech recognition (ASR) processes and text-to-speech (TTS) processes. The illustrated architecture can create a policy in which applications must request and release the shared functionality of the speech recognition and TTS engines so that only a single application will be able to perform the non-sharable functions at a time.

In system 200, voice shell process 202 and distributed process 204 can interact with a plurality of speech processes, including TTS server process 206 and 207, ASR server process 208 and 209, and vocabulary server 282. Voice shell process 202 can include a stand-alone process, such as a voice shell process. Distributed process 204 can include any type of distributed process including a Central Service Manager (CSM) process.

Processes 202 and 204 can be linked to the processes 206, 207, 208, and 209 though a device specific link. For example, processes 206 and 208 can include a link to device A, which can be an audio device. Processes 207 and 209 can include a link to device B, which can be a different audio device.

It should be appreciated that the arrangements shown for system 200 are for illustrative purposes only and the other derivatives and modifications obvious to one of ordinary skill in the art are contemplated herein. For example, in one embodiment, voice shell process 202 can be shared across multiple devices, such as multiple audio devices that can include an audio device A and an audio device B. In another embodiment, a separate voice shell process can be implemented for each device, as illustrated by voice shell process 202 for device A and voice shell process 260 for device B.

Each process can be linked to one or more applications though a process specific interface. Accordingly, interface 212 and 222 can be used to interface applications 210 and 220 with TTS server process 206. Interface 214 and 224 can be used to interface applications 210 and 220 with ASR server process 208. Additionally, interface 242 and 252 can be used to interface applications 240 and 250 with TTS server process 207. Interface 272 can interface application 270 with vocabulary server 282. Interface 274, 244, and 254 can interface applications 270, 240, and 250 with ASR server process 209. One or more of the server processes, such as ASR server process 209 can also interface with shell processes, such as shell process 260.

Each of the interfaces 212, 214, 222, 224, 272, 274, 242, 244, 252, 254, 262, 264, 266, and 268 can be standardized interfaces that are able to interface directly or which require the use of a gateway. In one configuration, interfaces 212, 222, 242, 252, 262, 266, and 272 can be Text-To-Speech (TTS) interfaces that facilitate communications between the various processes to the application. Interfaces 214, 224, 244, 254, 264, 268, and 274 can be Embedded Speech Recognition (ESR) interfaces that facilitate communications between the various processes to the applications. System 200 is not to be construed as limited in this regard, and any suitable interface can be used herein.

Server processes 206 and 208 can also interface with one or more application environments 234. An application environment 234 can, for example, include a JAVA Virtual Machine (JVM) environment. Interfaces linking the application environment 234 to speech processes 206 and 208 can be provided. These interfaces can link processes to specific connectors within the application environment 234, such as connectors 230 and 232. In one embodiment, connectors 230 and 232 can include JSAP connectors.

For example, interface 262 can be an interface between TTS server process 206 and connector 230. Interface 266 can be an interface between TTS server process 206 and connector 232. Interface 264 can be an interface between ASR server process 208 and connector 230. Interface 268 can be an interface between ASR server process 208 and connector 232.

Figure 3:
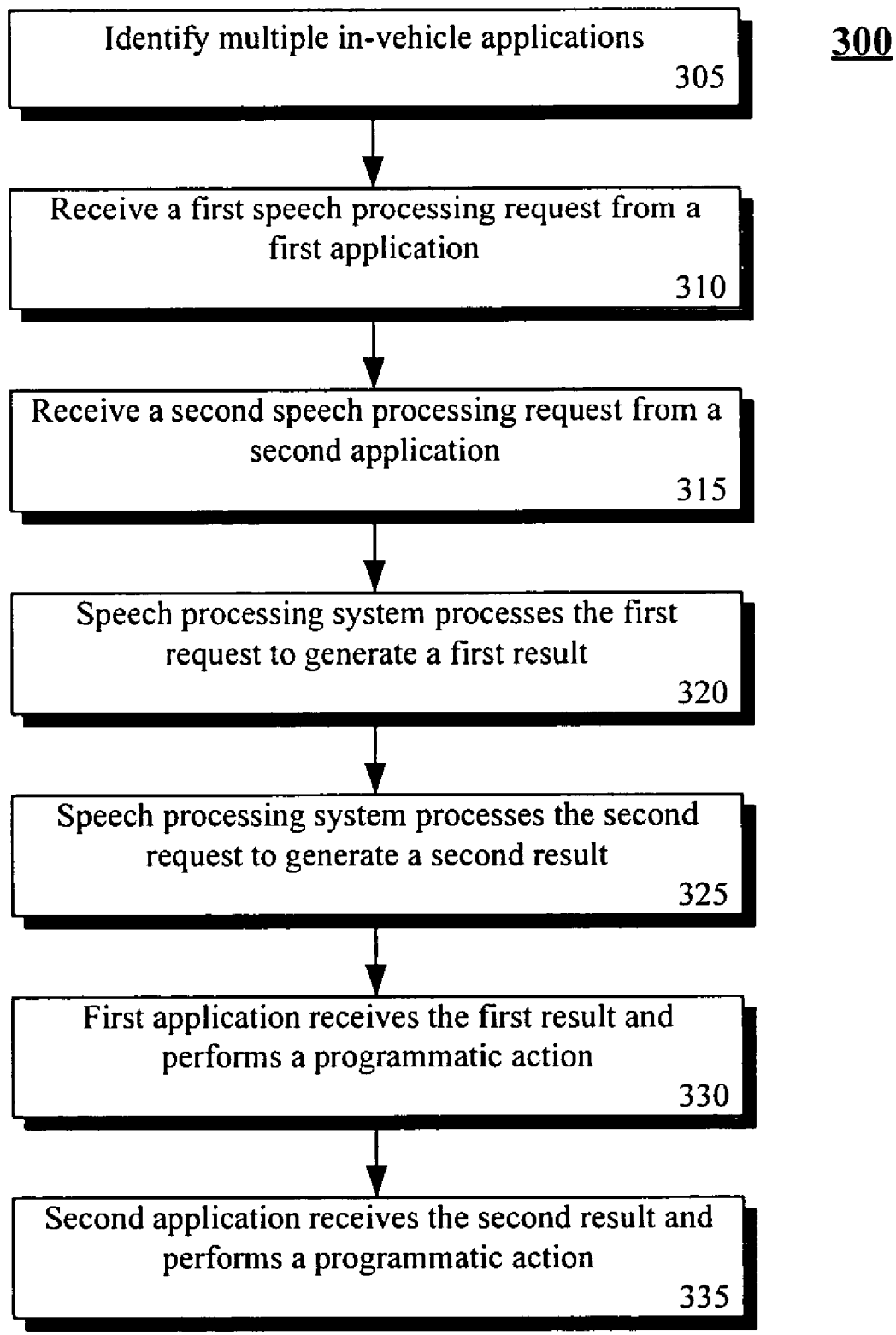
FIG. 3 is a flowchart of a method for sharing speech processing resources among multiple applications located within a vehicle in accordance with an embodiment of the illustrative arrangements disclosed herein.

FIG. 3 is a flowchart of a method 300 for sharing speech processing resources among multiple applications located within a vehicle in accordance with an embodiment of the illustrative arrangements disclosed herein. Method 300 can be performed in the context of any in-vehicle system having multiple applications, such as system 100 and/or system 200.

Method 300 can begin in step 305 where multiple in-vehicle applications can be identified. Each application can be configured to be simultaneously and independently utilized by different users. In step 310, a first speech processing request can be received from an in-vehicle console associated with a first one of the in-vehicle applications. In step 315, a second speech processing request can be received from an in-vehicle console associated with a second one of the in-vehicle applications.

When the first and second requests are received at approximately the same time, and when both requests require the same limited speech processing resources, a mechanism is needed to select among the first and second requests so that one is able to utilize the resources before the other. While any mechanism and/or prioritization scheme can resolve this problem of limited resources, in one embodiment a speech focus model can be used. In a speech focus model, one of the first and second applications is granted a speech focus. The application with speech focus is able to use speech processing resources associated with the focus. The other must wait until the speech focus is surrendered, must then acquire speech focus, and is then able to use the associated speech resources.

In step 320, the speech processing system can process the first speech processing request to generate a first processing result. In step 325, the second speech processing request can be processed to generate a second speech processing result. Different types of speech processing requests can be handled by the speech processing system, each type producing different types of results. For example, an automatic speech recognition request can include a speech utterance input that is conveyed to the speech processing system, which can be converted into a textual result. A speech generation request can include a textual word or phrase, from which the speech processing system can produce digitally encoded speech.

In step 330, the first in-vehicle application can receive the first speech processing result and responsively perform a programmatic action, which can result in information (results from the request) being presented upon an in-vehicle console corresponding to the first in-vehicle application. In step 335, the second in-vehicle application can receive the second speech processing result and can responsively execute a second programmatic action within a console associated with the second in-vehicle application. It should be appreciated that the speech processes that execute responsive to application request can be server processes, where the applications operate as clients for these server processes.

Figure 4:
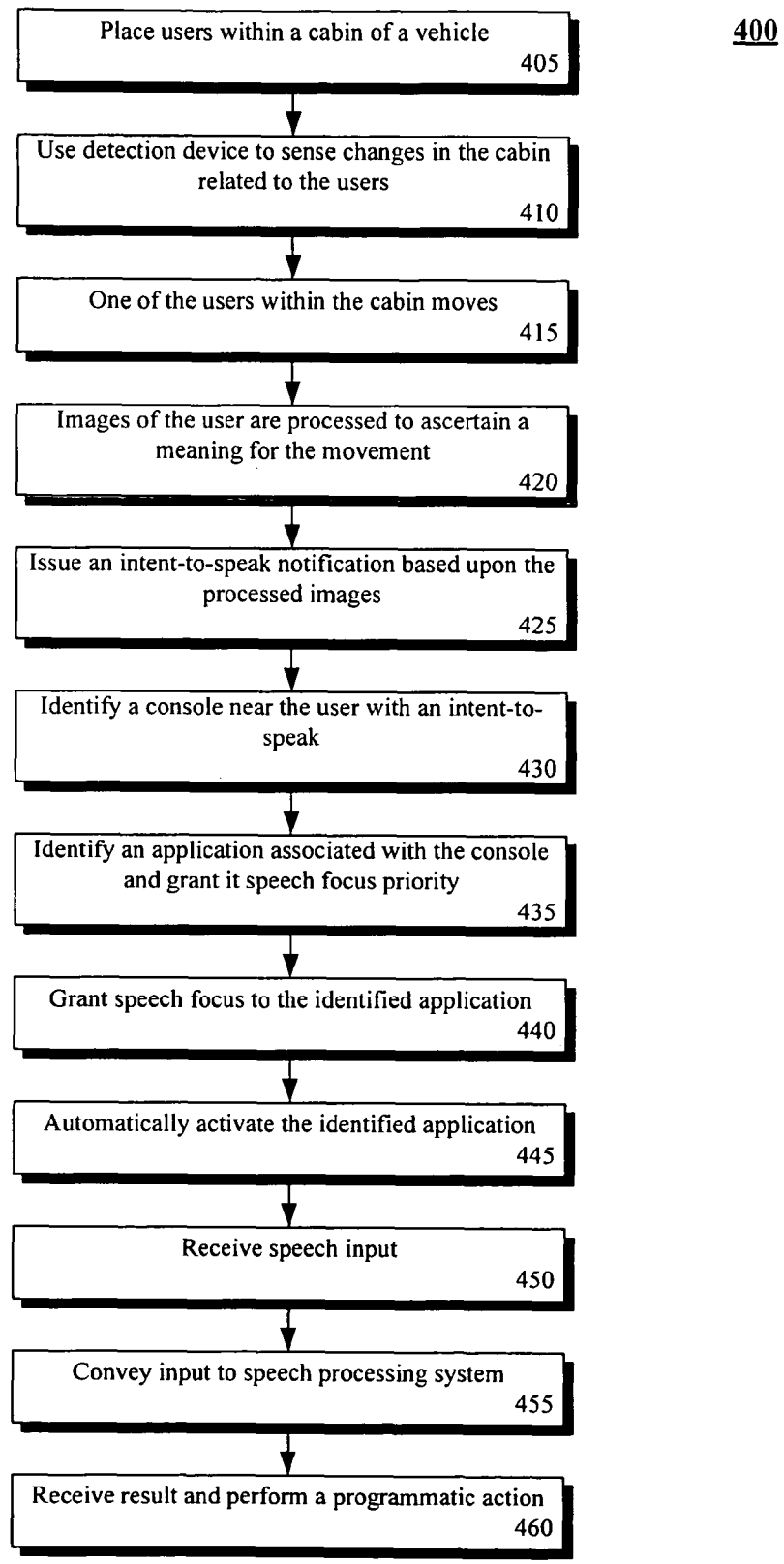
FIG. 4 is a flow chart of a method for determining speech focus within an in-vehicle system comprising multiple console-specific applications in accordance with an embodiment of the inventive arrangements disclosed herein.

FIG. 4 is a flow chart of a method 400 for determining speech focus within an in-vehicle system comprising multiple console-specific applications in accordance with an embodiment of the inventive arrangements disclosed herein. The method 400 can be performed in the context of any in-vehicle system supporting multiple applications through a single speech interface, such as system 100 and/or system 200. The method 400 can also be an extension of method 300, which provides a specific means for determining speech focus.

Method 400 can begin in step 405, where a plurality of users can be located within a cabin of a vehicle. Each user can be located in a position proximate to an in-vehicle console. In step 410, one or more cameras or other detection devices can sense changes in the cabin related to the users. For example, in step 415, one of the users within the cabin can move, which can be determined from processing a series of captured images. In step 420, the captured images can be processed to ascertain meaning.

In step 425, an intent-to-speak notification can be issued based upon the processed images. The intent-to-speak can indicate that there is a high likelihood that a particular individual is about to speak to a console capable of accepting speech input. In one embodiment, the intent-to-speak can be used as a functional analogue to a speak button, such as a push-to-talk button. That is, the images and image processing operations can initiate a push-to-talk event.

In step 430, the console and speech-enabled application residing therein that is nearest to the user identified as having an intent-to-speak can be identified. In step 435, the identified application can be given priority for acquiring a speech focus. For example, in a system where applications compete or barter for the intent to speak based upon weighted criteria, the intent-to-speak can be one of these criteria that places the identified application in a preferential position relative to other competing applications.

In step 440, the identified application can be granted the speech focus. In step 445, responsive to receiving speech focus, the application can be automatically activated to receive speech input. In step 450, the speech input can be received. In step 455, the input can be conveyed to the speech processing system, which can generate a result. In step 460, the result can be conveyed back to the identified application, which can perform one or more programmatic actions based upon the result.

It should be appreciated that although images and cameras are described above for the detection device, the invention is not to be construed as limited in this regard. In one embodiment, the detecting device can include one or more motion detector instead of a camera and input from the motion detectors can be used to ascertain an intent to speak. Additionally, other detecting devices, such as pressure sensors, beam breakage sensors, audio sensors, and the like can be utilized in place of or in conjunction with the image capture sensors described herein.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for use in a vehicle comprising a plurality of in-vehicle consoles comprising at least a first in-vehicle console and a second in-vehicle console, the method comprising acts, performed via a speech processor, of:

(A) receiving, at the speech processor, a first speech processing request from the first in-vehicle console, wherein the first in-vehicle console comprises a first computer running at least one first speech-enabled application, where the first speech processing request comprises at least one first signal indicative of a first spoken utterance;

(B) processing the first speech processing request to recognize first content in the first spoken utterance and generate a first processing result based, at least in part, on the recognized first content;

(C) sending the first processing result to the first in-vehicle console;

(D) receiving, at the speech processor, a second speech processing request from the second in-vehicle console, wherein the second in-vehicle console comprises a second computer running at least one second speech-enabled application, where the second speech processing request comprises at least one second signal indicative of a second spoken utterance;

(E) processing the second speech processing request to recognize second content in the second spoken utterance and generate a second processing result based, at least in part, on the recognized second content; and (F) sending the second processing result to the second in-vehicle console;
wherein the first in-vehicle console and second in-vehicle console are configured to be operated independently and simultaneously.

2. The method of claim 1 wherein the at least one first speech-enabled application running on the first in-vehicle console is selected from a group consisting of a web browser, a movie player, and a video game.

3. The method of claim 1 wherein the first in-vehicle console is a removable device.

4. The method of claim 1 wherein the first in-vehicle console has a dock that allows at least one external device to interoperate with the console.

5. The method of claim 4 wherein the at least one external device is selected from a group consisting of a mobile phone, a portable MP3 player, a global positioning system, a personal data assistant, a signature capture device, a computing tablet, a notebook computer, a DVD player, a video gaming unit, a digital camera, and a portable storage device.

6. The method of claim 1 wherein the first in-vehicle console has a microphone.

7. The method of claim 1 wherein the first in-vehicle console has a camera.

8. The method of claim 1 wherein the first processing result is a textual result.

9. A vehicle comprising:
a plurality of in-vehicle consoles comprising at least a first in-vehicle console and a second in-vehicle console configured to be operated independently and simultaneously, wherein the first in-vehicle console comprises a first computer running at least one first speech-enabled application, and wherein the second in-vehicle console comprises a second computer running at least one second speech-enabled application;
a speech processor programmed to service speech requests from the first and second in-vehicle consoles by:
receiving a first speech processing request from the first in-vehicle console, where the first speech processing request comprises at least one first signal indicative of a first spoken utterance;
processing the first speech processing request to recognize first content in the first spoken utterance and generate a first processing result based, at least in part, on the recognized first content; and
sending the first processing result to the first in-vehicle console;
receiving a second speech processing request from the second in-vehicle console, where the second speech processing request comprises at least one second signal indicative of a second spoken utterance;
processing the second speech processing request to recognize second content in the second spoken utterance and generate a second processing result based, at least in part, on the recognized second content; and
sending the second processing result to the second in-vehicle console.

10. The vehicle of claim 9 wherein the at least one first speech-enabled application running on the first in-vehicle console is selected from a group consisting of a web browser, a movie player, and a video game.

11. The vehicle of claim 9 wherein the first in-vehicle console is a removable device.

12. The vehicle of claim 9 wherein the first in-vehicle console has a dock that allows at least one external device to interoperate with the console.

13. The vehicle of claim 12 wherein the at least one external device is selected from a group consisting of a mobile phone, a portable MP3 player, a global positioning system, a personal data assistant, a signature capture device, a computing tablet, a notebook computer, a DVD player, a video gaming unit, a digital camera, and a portable storage device.

14. The vehicle of claim 9 wherein the first in-vehicle console has a microphone.

15. The vehicle of claim 9 wherein the first in-vehicle console has a camera.

16. The vehicle of claim 9 wherein the first in-vehicle console has a display.

17. The vehicle of claim 9 wherein the first in-vehicle console and second in-vehicle console are configured to be operated simultaneously by different users.

18. At least one nontransitory computer-readable recording medium encoded with a plurality of instructions that, when executed by at least one speech processor, perform a method comprising:
(A) receiving, at the speech processor, a first speech processing request from a first in-vehicle console, wherein the first in-vehicle console comprises a first computer running at least one first speech-enabled application, where the first speech processing request comprises at least one first signal indicative of a first spoken utterance;
(B) processing the first speech processing request to recognize first content in the first spoken utterance and generate a first processing result based, at least in part, on the recognized first content;
(C) sending the first processing result to the first in-vehicle console;
(D) receiving, at the speech processor, a second speech processing request from a second in-vehicle console, wherein the second in-vehicle console comprises a second computer running at least one second speech-enabled application, where the second speech processing request comprises at least one second signal indicative of a second spoken utterance;
(E) processing the second speech processing request to recognize second content in the second spoken utterance and generate a second processing result based, at least in part, on the recognized second content; and
(F) sending the second processing result to the second in-vehicle console;
wherein the first in-vehicle console and second in-vehicle console are configured to be operated independently and simultaneously.

19. The at least one computer-readable medium of claim 18 wherein the at least one first speech-enabled application running on the first in-vehicle console is selected from a group consisting of a web browser, a movie player, and a video game.

20. The at least one computer-readable medium of claim 18 wherein the first in-vehicle console has a dock that allows at least one external device to interoperate with the console.

21. The at least one computer-readable medium of claim 20 wherein the at least one external device is selected from a group consisting of a mobile phone, a portable MP3 player, a global positioning system, a personal data assistant, a signature capture device, a computing tablet, a notebook computer, a DVD player, a video gaming unit, a digital camera, and a portable storage device.

22. An in-vehicle system comprising:
at least a first console adapted to be operated by a first user;
at least a second console adapted to be operated by a second user; and a speech processor to receive and process speech requests from the first and second consoles, wherein the in-vehicle system is configured to service speech requests received simultaneously at the first console and the second console, wherein the speech processor is configured to:
process a first speech processing request received from the first console and send a first result to the first console, the first result being responsive to the first speech processing request; and
process a second speech processing request received from the second console and send a second result to the second console, the second result being responsive to the second speech processing request; and wherein the first console and the second console each is configured to run at least one speech-enabled application.

23. The in-vehicle system of claim 22, wherein the at least one speech-enabled application is selected from a group consisting of: a web browser, a movie player, and a video game.

24. The in-vehicle system of claim 22, wherein the first console is a removable device.

25. The in-vehicle system of claim 22, wherein the first console has a dock that allows at least one external device to interoperate with the first console.

26. The in-vehicle system of claim 25, wherein the at least one external device is selected from a group consisting of: a mobile phone, a portable MP3 player, a global positioning system, a personal data assistant, a signature capture device, a computing tablet, a notebook computer, a DVD player, a video gaming unit, a digital camera, and a portable storage device.

27. The in-vehicle system of claim 22, the first console further comprising a microphone and the second console further comprising a microphone.

28. A method for use in a vehicle comprising a plurality of in-vehicle consoles comprising at least a first in-vehicle console and a second in-vehicle console, the method comprising acts, performed via a speech processor, of:
(A) receiving, at the speech processor, a first speech processing request from the first in-vehicle console, wherein the first in-vehicle console comprises a first computer running at least one first speech-enabled application, where the first speech processing request comprises at least one first signal indicative of a first spoken utterance;
(B) processing the first speech processing request to recognize first content in the first spoken utterance and generate a first processing result based, at least in part, on the recognized first content;
(C) sending the first processing result to the first in-vehicle console;
(D) receiving, at the speech processor, a second speech processing request from the second in-vehicle console, wherein the second in-vehicle console comprises a second computer running at least one second speech-enabled application, where the second speech processing request comprises at least one second signal indicative of a second spoken utterance;
(E) processing the second speech processing request to recognize second content in the second spoken utterance and generate a second processing result based, at least in part, on the recognized second content; and
(F) sending the second processing result to the second in-vehicle console;
wherein the first in-vehicle console and second in-vehicle console are configured to be operated simultaneously by different users.

29. A vehicle comprising:
a plurality of in-vehicle consoles comprising at least a first in-vehicle console and a second in-vehicle console configured to be operated simultaneously by different users, wherein the first in-vehicle console comprises a first computer running at least one first speech-enabled application, and wherein the second in-vehicle console comprises a second computer running at least one second speech-enabled application;
a speech processor programmed to service speech requests from the first and second in-vehicle consoles by:
receiving a first speech processing request from the first in-vehicle console, where the first speech processing request comprises at least one first signal indicative of a first spoken utterance;
processing the first speech processing request to recognize first content in the first spoken utterance and generate a first processing result based, at least in part, on the recognized first content; and
sending the first processing result to the first in-vehicle console;
receiving a second speech processing request from the second in-vehicle console, where the second speech processing request comprises at least one second signal indicative of a second spoken utterance;
processing the second speech processing request to recognize second content in the second spoken utterance and generate a second processing result based, at least in part, on the recognized second content; and
sending the second processing result to the second in-vehicle console.

30. At least one nontransitory computer-readable recording medium encoded with a plurality of instructions that, when executed by at least one speech processor, perform a method comprising:
(A) receiving, at the speech processor, a first speech processing request from a first in-vehicle console, wherein the first in-vehicle console comprises a first computer running at least one first speech-enabled application, where the first speech processing request comprises at least one first signal indicative of a first spoken utterance;
(B) processing the first speech processing request to recognize first content in the first spoken utterance and generate a first processing result based, at least in part, on the recognized first content;
(C) sending the first processing result to the first in-vehicle console;
(D) receiving, at the speech processor, a second speech processing request from a second in-vehicle console, wherein the second in-vehicle console comprises a second computer running at least one second speech-enabled application, where the second speech processing request comprises at least one second signal indicative of a second spoken utterance;
(E) processing the second speech processing request to recognize second content in the second spoken utterance and generate a second processing result based, at least in part, on the recognized second content; and
(F) sending the second processing result to the second in-vehicle console;
wherein the first in-vehicle console and second in-vehicle console are configured to be operated simultaneously by different users.

* * * * *